United States Patent
Pan et al.

(10) Patent No.: US 10,757,776 B1
(45) Date of Patent: Aug. 25, 2020

(54) USB INPUT DEVICE WITH LUMINOUS FUNCTION

(71) Applicant: Primax Electronics Ltd., Taipei (TW)

(72) Inventors: Ding-Hsiang Pan, Taipei (TW); Hui-Ling Lin, Taipei (TW); Chuan-Tai Hsiao, Taipei (TW); Chun-Han Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/518,768

(22) Filed: Jul. 22, 2019

(30) Foreign Application Priority Data

Mar. 29, 2019 (TW) .............................. 108111340 A

(51) Int. Cl.
| | |
|---|---|
| H05B 45/20 | (2020.01) |
| F21V 33/00 | (2006.01) |
| H05B 45/40 | (2020.01) |
| G06F 3/038 | (2013.01) |
| G06F 3/0354 | (2013.01) |
| G06F 3/023 | (2006.01) |

(52) U.S. Cl.
CPC .......... *H05B 45/20* (2020.01); *F21V 33/0052* (2013.01); *G06F 3/038* (2013.01); *H05B 45/40* (2020.01); *G06F 3/023* (2013.01); *G06F 3/03543* (2013.01)

(58) Field of Classification Search
None
See application file for complete search history.

(56) References Cited

U.S. PATENT DOCUMENTS

2013/0147375 A1* 6/2013 Williams ............... H05B 45/20
315/192

* cited by examiner

*Primary Examiner* — Jimmy T Vu
*Assistant Examiner* — Laura Yesildag
(74) *Attorney, Agent, or Firm* — Kirton McConkie; Evan R. Witt

(57) ABSTRACT

An input device includes a universal serial bus interface, a white light-emitting diode unit, a red light-emitting diode unit, a green light-emitting diode unit, a blue light-emitting diode unit and a driving part. The driving part receives electricity through the universal serial bus and drives at least one of the white light-emitting diode unit, the red light-emitting diode unit, the green light-emitting diode unit and the blue light-emitting diode unit to emit a light beam. Consequently, the light beam with a higher luminous intensity and a specified color is outputted from the input device.

18 Claims, 2 Drawing Sheets

USB INPUT DEVICE WITH LUMINOUS FUNCTION

FIELD OF THE INVENTION

The present invention relates to an input device, and more particularly to an input device with a luminous function.

BACKGROUND OF THE INVENTION

Generally, the common input device such as a mouse or a keyboard is electrically connected with a computer through a universal serial bus (USB) interface. Consequently, the computer can provide electricity to the input device through the USB interface in order for powering the input device. In addition, the user can operate the input device to perform the input operation on the computer. For example, characters and symbols can be directly inputted into the computer through the keyboard. When the mouse is held by the user's palm and moved, the cursor shown on a display screen of the computer is correspondingly moved. Moreover, when the mouse is operated through the user's finger, the icon or the window shown on the display screen of the computer can be selected or scrolled.

For increasing the application and entertainment, an input device with a luminous function has been introduced into the market. For example, the input device with the luminous function includes a luminous keyboard or a luminous mouse. FIG. 1 is a schematic functional block diagram illustrating a portion of a conventional input device with a luminous function. The input device 1 comprises a USB interface 11, a red LED unit 12, a green LED unit 13, a blue LED unit 14, a microprocessor 15 and a driving circuit 16. The USB interface 11 is electrically connected between the computer 2 and the microprocessor 15. The driving circuit 16 is connected between the microprocessor 15, the red LED unit 12, the green LED unit 13 and the blue LED unit 14. The microprocessor 15 acquires electricity from the computer 2 through the USB interface 11. Consequently, the microprocessor 15 provides a first driving current I11, a second driving current I12 and a third driving current I13 to the red LED unit 12, the green LED unit 13 and the blue LED unit 14, respectively.

When the first driving current I11 is transmitted to the red LED unit 12 through the driving circuit 16, the red LED unit 12 emits a red light beam. When the second driving current I12 is transmitted to the green LED unit 13 through the driving circuit 16, the green LED unit 13 emits a green light beam. When the third driving current I13 is transmitted to the blue LED unit 14 through the driving circuit 16, the blue LED unit 14 emits a blue light beam. According to the practical requirements, the red light beam, the green light beam and the blue light beam may be mixed together. Consequently, the mixed light beam with a specified color can be outputted from the input device 1. For example, the mixed light beam is a white light.

However, the applications of the input device 1 with the luminous function are usually limited. For example, in case that the USB interface 11 is a USB2.0 interface, the input device 1 is only able to receive the operating voltage of 5V and the operating current of 500 mA. For allowing the input device to output the mixed light beam (i.e., the white light) of the red light beam, the green light beam and the blue light beam, the operating current of the input device 1 (e.g., 500 mA) is averagely split into the first driving current I11, the second driving current I12 and the third driving current I13. That is, the upper limit of the first driving current I11, the upper limit of the second driving current I12 and the upper limit of the third driving current I13 are approximately in the range between 150 mA and 170 mA. Consequently, the luminous intensity of the white light from the input device is usually insufficient.

As mentioned above, each of the upper limit of the first driving current I11, the upper limit of the second driving current I12 and the upper limit of the third driving current I13 is approximately in the range between 150 mA and 170 mA. In case that the input device 1 provides the red light beam only, the luminous intensity of the red light beam is insufficient. Similarly, in case that the input device 1 provides the green light beam only, the luminous intensity of the green light beam is insufficient. Similarly, in case that the input device 1 provides the blue light beam only, the luminous intensity of the blue light beam is insufficient. In other words, the light utilization efficiency of the conventional input device 1 is not satisfactory.

Moreover, the conventional input device 1 with the luminous function still has some other drawbacks. For example, the color of the output light is adjusted according to the red light beam from the LED unit 12, the green light beam from the green LED unit 13 and the blue light beam from the blue LED unit 14 only. Consequently, the adjusting flexibility of the color of the output light in the chromaticity coordinate is restricted. Especially when the output light is the white light, the adjusting flexibility is largely restricted. For allowing the white light to comply with the required white balance color temperature, it is necessary to simultaneously adjust the first driving current I11, the second driving current I12 and the third driving current I13. After many experiments and calibrations, the color of the output light from the input device 1 may reach the corresponding chromaticity coordinate.

In other words, the conventional input device needs to be further improved.

SUMMARY OF THE INVENTION

An object of the present invention provides an input device with a white LED unit. Since the input device is equipped with the white LED unit, the overall luminous intensity of the light beam from the input device is increased and the flexibility of modulating the chromaticity coordinate is enhanced.

In accordance with an aspect of the present invention, an input device is provided. The input device includes a universal serial bus interface, a white light-emitting diode unit, a red light-emitting diode unit, a green light-emitting diode unit, a blue light-emitting diode unit and a driving part. The driving part is electrically connected between the universal serial bus interface, the white light-emitting diode unit, the red light-emitting diode unit, the green light-emitting diode unit and the blue light-emitting diode unit. The driving part receives electricity through the universal serial bus and provides a first driving current to the white light-emitting diode unit, and the driving part receives electricity through the universal serial bus and provides a second driving current to the red light-emitting diode unit and/or provides a third driving current to the green light-emitting diode unit and/or provides a fourth driving current to the blue light-emitting diode unit. The white light-emitting diode unit emits a white light beam in response to the first driving current. The red light-emitting diode unit emits a red light beam in response to the second driving current. The green light-emitting diode unit emits a green light beam in response to the third driving current. The blue light-emitting diode unit emits a blue light beam in response to the fourth driving current. At least one of the red light beam, the green light beam and the blue light beam is mixed with the white light beam. Consequently, a mixed light with a white balance color temperature is outputted from the input device.

In accordance with another aspect of the present invention, an input device is provided. The input device includes a universal serial bus interface, a white light-emitting diode unit, a red light-emitting diode unit, a green light-emitting diode unit, a blue light-emitting diode unit and a driving part. The driving part is electrically connected between the universal serial bus interface, the white light-emitting diode unit, the red light-emitting diode unit, the green light-emitting diode unit and the blue light-emitting diode unit. The driving part receives electricity through the universal serial bus and provides a first driving current to the white light-emitting diode unit, and the driving part receives electricity through the universal serial bus and provides a second driving current to the red light-emitting diode unit and/or provides a third driving current to the green light-emitting diode unit and/or provides a fourth driving current to the blue light-emitting diode unit. The white light-emitting diode unit emits a white light beam in response to the first driving current. The red light-emitting diode unit emits a red light beam in response to the second driving current. The green light-emitting diode unit emits a green light beam in response to the third driving current. The blue light-emitting diode unit emits a blue light beam in response to the fourth driving current. A first driving current upper limit of the first driving current is X1 mA. An operating current of the universal serial bus interface is X mA. The relationship between the first driving current upper limit and the operating current of the universal serial bus interface is expressed as: $0.8X \leq X1 \leq X$.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an input device. The input device is electrically connected with an electronic device through a USB interface. The user can operate the input device to perform an input operation on the electronic device. The input device of the present invention further possesses a luminous function so as to provide the application, the aesthetically-pleasing appearance and/or the entertainment. In an embodiment, the input device is a luminous mouse, and the electronic device electrically connected with the luminous mouse is a computer. When the mouse is held by the user's palm and moved, the cursor shown on a display screen of the computer is correspondingly moved. Moreover, when the mouse is operated through the user's finger, the icon or the window shown on the display screen of the computer can be selected or scrolled. In another embodiment, the input device is a luminous keyboard, and the electronic device electrically connected with the luminous keyboard is a computer. The luminous keyboard comprises plural keys. These keys are classified into some types, e.g., ordinary keys, numeric keys and function keys. When one of the keys is depressed by the user's finger, a corresponding key signal is generated to the computer, and thus the computer executes a function corresponding to the depressed key. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions. In accordance with the present invention, the luminous mouse and the luminous keyboard are two examples of the input device of the present invention, and the electronic device is the computer. It is noted that the example of the input device and the example of the electronic device are not restricted.

Figure 1:
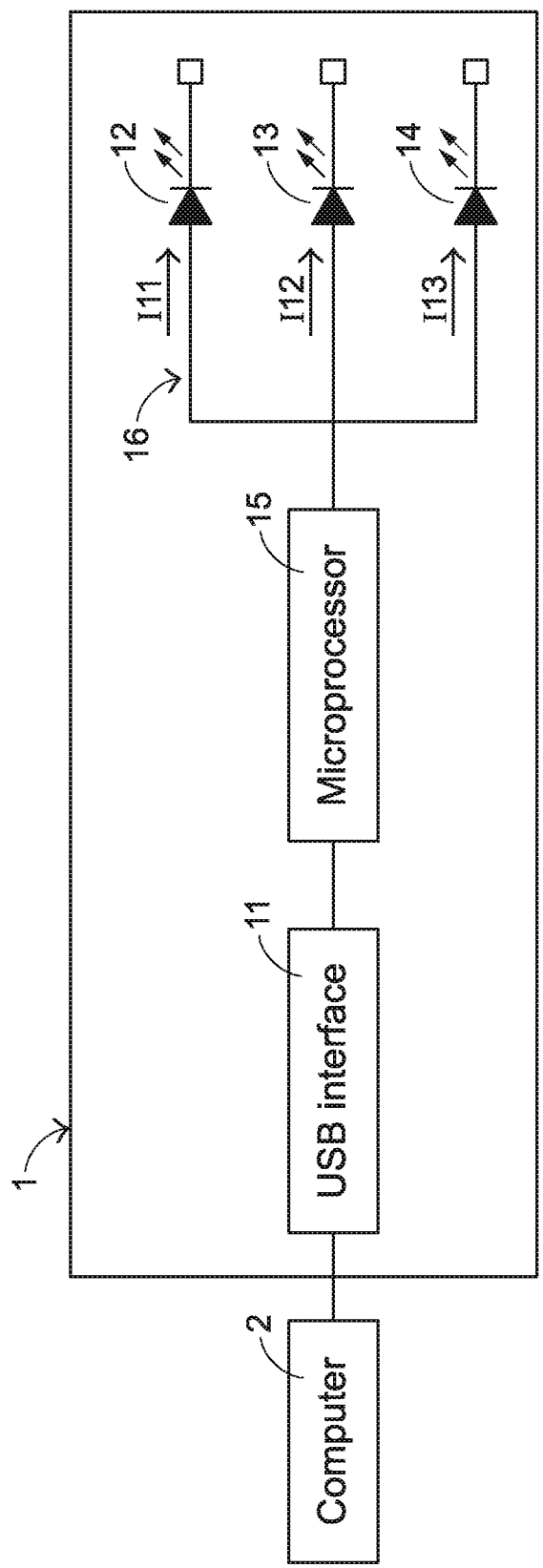
FIG. 1 is a schematic functional block diagram illustrating a portion of a conventional input device with a luminous function.
Figure 2:
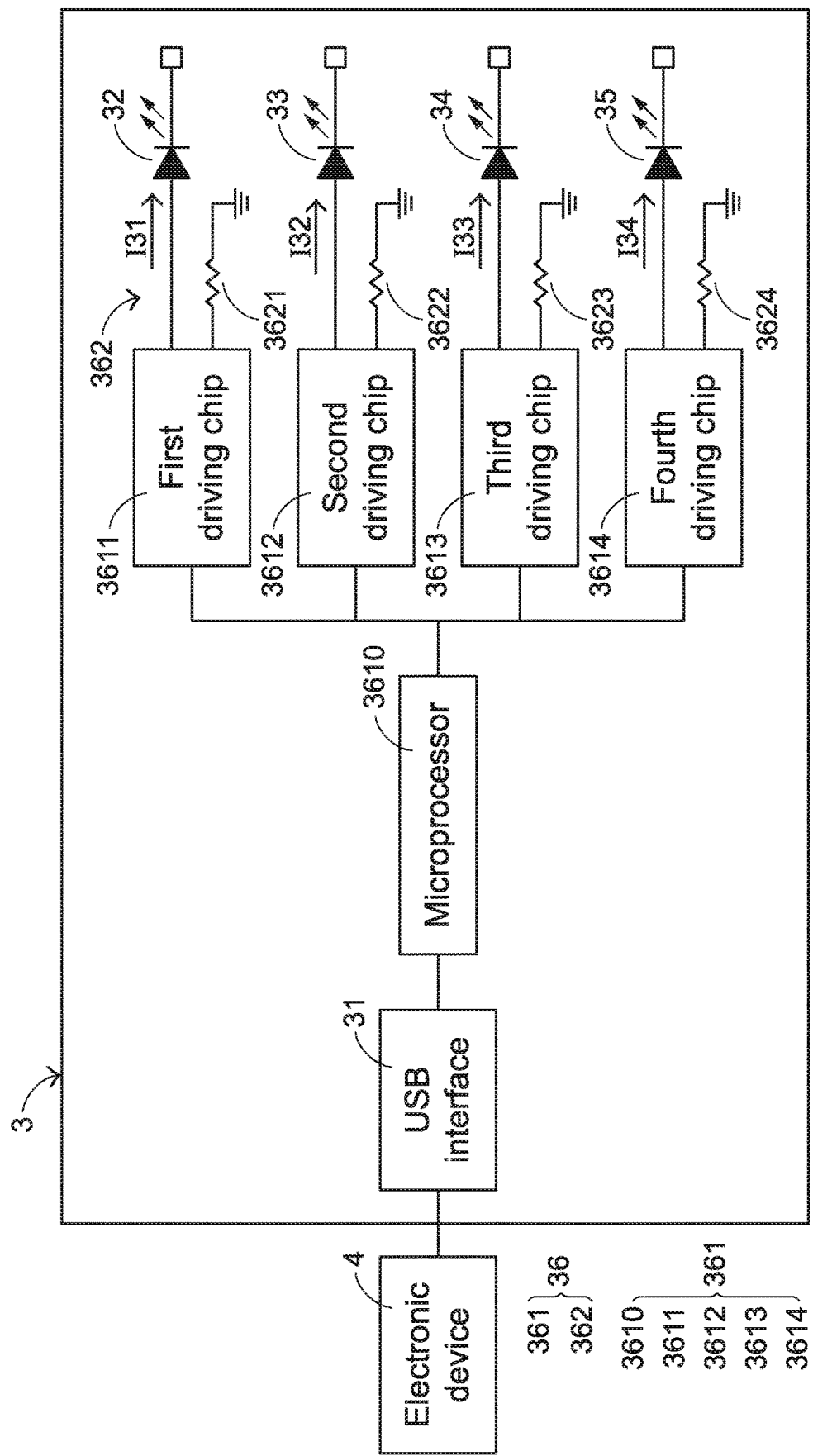
FIG. 2 is a schematic functional block diagram illustrating a portion of an input device according to an embodiment of the present invention.

FIG. 2 is a schematic functional block diagram illustrating a portion of an input device according to an embodiment of the present invention. The input device 3 comprises a USB interface 31, a white LED unit 32, a red LED unit 33, a green LED unit 34, a blue LED unit 35 and a driving part 36. The USB interface 31 is electrically connected with an electronic device 4. The driving part 36 is electrically connected between the USB interface 31, the white LED unit 32, the red LED unit 33, the green LED unit 34 and the blue LED unit 35. The driving part 36 acquires electricity from the electronic device 4 through the USB interface 31. Consequently, the white LED unit 32, the red LED unit 33, the green LED unit 34 and the blue LED unit 35 are powered by the corresponding driving currents.

In an embodiment, the driving part 36 comprises a control unit 361 and a driving circuit 362. The control unit 361 is electrically connected with the USB interface 31. The driving circuit 362 is electrically connected between the control unit 361 and the white LED unit 32, the red LED unit 33, the green LED unit 34 and the blue LED unit 35. Preferably but not exclusively, the control unit 361 comprises a microprocessor 3610, a first driving chip 3611, a second driving chip 3612, a third driving chip 3613 and a fourth driving chip 3614. The first driving chip 3611, the second driving chip 3612, the third driving chip 3613 and the fourth driving chip 3614 are electrically connected with the white LED unit 32, the red LED unit 33, the green LED unit 34 and the blue LED unit 35, respectively. The driving circuit 362 comprises a first resistor 3621, a second resistor 3622, a third resistor 3623 and a fourth resistor 3624 corresponding to the white LED unit 32, the red LED unit 33, the green LED unit 34 and the blue LED unit 35, respectively. The first resistor 3621 is electrically connected with the first driving chip 3611. The magnitude and/or the upper limit of the current (e.g. a first driving current I31) flowing to the white LED unit 32 is adjustable through the first resistor 3621. For illustration, the upper limit of the first driving current I31 is referred as a first driving current upper limit. The second resistor 3622 is electrically connected with the second driving chip 3612. The magnitude and/or the upper limit of the current (e.g. a second driving current I32) flowing to the red LED unit 33 is adjustable through the second resistor 3622. For illustration, the upper limit of the second driving current I32 is referred as a second driving current upper limit. The third resistor 3623 is electrically connected with the third driving chip 3613. The magnitude and/or the upper limit of the current (e.g. a third driving current I33) flowing to the green LED unit 34 is adjustable through the third resistor 3623. For illustration, the upper limit of the third driving current I33 is referred as a third driving current upper limit. The fourth resistor 3624 is electrically connected with the fourth driving chip 3614. The magnitude and/or the upper limit of the current (e.g. a fourth driving current I34) flowing to the blue LED unit 35 is adjustable through the fourth resistor 3624. For illustration, the upper limit of the fourth driving current I34 is referred as a fourth driving current upper limit.

The example of the driving part 36 is not restricted. It is noted that numerous modifications and alterations may be made while retaining the teachings of the invention. In another embodiment, the control unit 361 of the driving part 36 comprises the microprocessor 3610 only. That is, the control unit 361 of the driving part 36 is not equipped with the first driving chip 3611, the second driving chip 3612, the third driving chip 3613 and the fourth driving chip 3614. The first resistor 3621 of the driving circuit 362 is electrically connected between the microprocessor 3610 and the white LED unit 32. The second resistor 3622 of the driving circuit 362 is electrically connected between the microprocessor 3610 and the red LED unit 33. The third resistor 3623 of the driving circuit 362 is electrically connected between the microprocessor 3610 and the green LED unit 34. The fourth resistor 3624 of the driving circuit 362 is electrically connected between the microprocessor 3610 and the blue LED unit 35.

After the driving part 36 receives the electricity, the driving part 36 provides the first driving current I31 to the white LED unit 32 according to the practical requirements. Consequently, the white LED unit 32 is driven to emit the white light beam. Similarly, according to the practical requirements, the driving part 36 provides the second driving current I32 to the red LED unit 33. Consequently, the red LED unit 33 is driven to emit the red light beam. Similarly, according to the practical requirements, the driving part 36 provides the third driving current I33 to the green LED unit 34. Consequently, the green LED unit 34 is driven to emit the green light beam. Similarly, according to the practical requirements, the driving part 36 provides the fourth driving current I34 to the blue LED unit 35. Consequently, the blue LED unit 35 is driven to emit the blue light beam.

Some usage scenarios of the input device 3 according to the practical requirements will be described as follows.

In a first usage scenario, the input device 3 needs to provide the white light beam but the white light beam outputted from the white LED unit 32 has not reached the white balance. For example, the white light beam outputted from the white LED unit 32 has the warm color temperature or the cold color temperature. Under this circumstance, the driving part 36 drives at least one of the red LED unit 33, the green LED unit 34 and the blue LED unit 35 to emit at least one of the red light beam, the green light beam and the blue light beam. After the white light beam from the white LED unit 32 is mixed with the at least one of the red light beam, the green light beam and the blue light beam, the mixed light beam with the white balance color temperature is outputted from the input device 3.

In a second usage scenario, the input device 3 needs to provide a light beam with a specified color, and the specified color is not the color of the light beam from any of the white LED unit 32, the red LED unit 33, the green LED unit 34 and the blue LED unit 35. Under this circumstance, the driving part 36 drives at least two of the white LED unit 32, the red LED unit 33, the green LED unit 34 and the blue LED unit 35 to emit at least two of the white light beam, the red light beam, the green light beam and the blue light beam. After the at least two of the white light beam, the red light beam, the green light beam and the blue light beam are mixed together, the mixed light beam with the specified color is outputted from the input device 3.

In a third usage scenario, the input device 3 needs to provide the red light beam only. Under this circumstance, the driving part 36 provides the second driving current I32 to the red LED unit 33. Consequently, the red LED unit 33 is driven to emit the red light beam.

In a fourth usage scenario, the input device 3 needs to provide the green light beam only. Under this circumstance, the driving part 36 provides the third driving current I33 to the green LED unit 34. Consequently, the green LED unit 34 is driven to emit the green light beam.

In a fifth usage scenario, the input device 3 needs to provide the blue light beam only. Under this circumstance, the driving part 36 provides the fourth driving current I34 to the blue LED unit 35. Consequently, the blue LED unit 35 is driven to emit the blue light beam As mentioned above, the input device 3 of the present invention is equipped with the white LED unit 32. When the input device 3 needs to output the white light beam, it is not necessary to simultaneously drive the red LED unit 33, the green LED unit 34 and the blue LED unit 35 to emit the red light beam, the green light beam and the blue light beam and it is not necessary to mix the red light beam, the green light beam and the blue light beam. The red LED unit 33, the green LED unit 34 and the blue LED unit 35 are driven by the second driving current I32, the third driving current I33 and the fourth driving current I34, respectively. According to the technology of the present invention, it is not necessary to averagely split the operating current of the USB interface 31 into the second driving current I32, the third driving current I33 and the fourth driving current I34, respectively. In other words, each of the first driving current upper limit of the first driving current I31, the second driving current upper limit of the second driving current I32, the third driving current upper limit of the third driving current I33 and the fourth driving current upper limit of the fourth driving current I34 is substantially equal to the operating current of the USB interface 31.

Since the first driving current upper limit of the first driving current I31 is substantially equal to the operating current of the USB interface 31, the following benefits can be provided. When the white LED unit 32 is driven to emit the white light beam, the luminous intensity of the white light beam from the input device 3 is higher than the luminous intensity of the white light beam from the conventional input device 1. In an embodiment, the luminous intensity of the white light beam from the input device 3 is at least 1.5 times the luminous intensity of the white light beam from the conventional input device 1.

Since the second driving current upper limit of the second driving current I32 is substantially equal to the operating current of the USB interface 31, the following benefits can be provided. When the red LED unit 33 is driven to emit the red light beam, the luminous intensity of the red light beam from the input device 3 is higher than the luminous intensity of the red light beam from the conventional input device 1. In an embodiment, the luminous intensity of the red light beam from the input device 3 is at least 3 times the luminous intensity of the red light beam from the conventional input device 1.

Since the third driving current upper limit of the third driving current I33 is substantially equal to the operating current of the USB interface 31, the following benefits can be provided. When the green LED unit 34 is driven to emit the green light beam, the luminous intensity of the green light beam from the input device 3 is higher than the luminous intensity of the green light beam from the conventional input device 1. In an embodiment, the luminous intensity of the green light beam from the input device 3 is at least 3 times the luminous intensity of the green light beam from the conventional input device 1.

Since the fourth driving current upper limit of the fourth driving current I34 is substantially equal to the operating current of the USB interface 31, the following benefits can be provided. When the blue LED unit 35 is driven to emit the blue light beam, the luminous intensity of the blue light beam from the input device 3 is higher than the luminous intensity of the blue light beam from the conventional input device 1. In an embodiment, the luminous intensity of the blue light beam from the input device 3 is at least 3 times the luminous intensity of the blue light beam from the conventional input device 1.

In case that the operating current of the USB interface 31 is X mA and the first driving current upper limit of the first driving current I31 is X1 mA, the relationship between the first driving current upper limit and the operating current of the USB interface 31 may be expressed as: $0.8X \leq X1 \leq X$.

In a first example, the USB interface 31 is a USB2.0 interface, and the operating current is 500 mA. Consequently, the first driving current upper limit of the first driving current I31 is in the range between 400 mA and 500 mA. In a second example, the USB interface 31 is a USB3.0 interface, and the operating current is 900 mA. Consequently, the first driving current upper limit of the first driving current I31 is in the range between 720 mA and 900 mA. In a third example, the USB interface 31 is a USB3.1 interface, and the operating current is 5000 mA. Consequently, the first driving current upper limit of the first driving current I31 is in the range between 4500 mA and 5000 mA.

The arrangement of the white LED unit 32 in the input device 3 further provides the following benefits. When the input device 3 needs to output the white light beam but the white light beam outputted from the white LED unit 32 has not reached the white balance, the driving part 36 only needs to control the magnitude of at least one of the second driving current I32, the third driving current I33 and the fourth driving current I34. Consequently, at least one of the red LED unit 33, the green LED unit 34 and the blue LED unit 35 to emit at least one of the red light beam, the green light beam and the blue light beam. After the white light beam from the white LED unit 32 is mixed with the at least one of the red light beam, the green light beam and the blue light beam, the mixed light beam with the white balance color temperature is outputted from the input device 3.

For example, in an embodiment, the driving part 36 of the input device 3 only controls the magnitude of the fourth driving current I34. Consequently, the blue LED unit 35 is driven to emit the blue light beam. After the white light beam from the white LED unit 32 is mixed with the blue light beam, the mixed light beam with the white balance color temperature is outputted from the input device 3. For allowing the light beam to comply with the required white balance, it is necessary to simultaneously adjust and control the second driving current I32, the third driving current I33 and the fourth driving current I34 according to the present invention and it is not necessary to undergo many experiments and calibrations.

In an embodiment, the driving part 36 of the input device 3 further controls the driving power of at least one of the white LED unit 32, the red LED unit 33, the green LED unit 34 and the blue LED unit 35 in a pulse width modulation (PWM) manner. After the white light beam from the white LED unit 32 is mixed with the at least one of the red light beam, the green light beam and the blue light beam and the mixed light beam with the white balance color temperature is outputted from the input device 3, the gray level of the mixed light beam with the white balance color temperature is adjusted.

As mentioned above, the input device 3 of the present invention is equipped with the white LED unit 32. When the input device 3 needs to provide a light beam with a specified color, the driving part 36 only needs to drive portions of the white LED unit 32, the red LED unit 33, the green LED unit 34 and the blue LED unit 35 to emit light beams. After these light beams are mixed together, the color of the output light from the input device 3 may reach the corresponding chromaticity coordinate. When compared with the conventional input device 1 of modulating the colors of the red light beam, the green light beam and the blue light beam, the flexibility of modulating the chromaticity coordinate by the present invention is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An input device, comprising:
   a universal serial bus interface;
   a white light-emitting diode unit;
   a red light-emitting diode unit;
   a green light-emitting diode unit;
   a blue light-emitting diode unit; and
   a driving part electrically connected between the universal serial bus interface, the white light-emitting diode unit, the red light-emitting diode unit, the green light-emitting diode unit and the blue light-emitting diode unit, wherein the driving part receives electricity through the universal serial bus and provides a first driving current to the white light-emitting diode unit, and the driving part receives electricity through the universal serial bus and provides a second driving current to the red light-emitting diode unit and/or provides a third driving current to the green light-emitting diode unit and/or provides a fourth driving current to the blue light-emitting diode unit,
   wherein the white light-emitting diode unit emits a white light beam in response to the first driving current, the red light-emitting diode unit emits a red light beam in response to the second driving current, the green light-emitting diode unit emits a green light beam in response to the third driving current, and the blue light-emitting diode unit emits a blue light beam in response to the fourth driving current, wherein at least one of the red light beam, the green light beam and the blue light beam is mixed with the white light beam, so that a mixed light with a white balance color temperature is outputted from the input device,
   wherein a first driving current upper limit of the first driving current is X1 mA, an operating current of the universal serial bus interface is X mA, and a relationship between the first driving current upper limit and the operating current of the universal serial bus interface is expressed as: $0.8X \leq X1 \leq X$.

2. The input device according to claim 1, wherein the universal serial bus interface is a USB2.0 interface and the operating current is 500 mA; or the universal serial bus interface is a USB3.0 interface and the operating current is 900 mA; or the universal serial bus interface is a USB3.1 interface and the operating current is 5000 mA.

3. The input device according to claim 1, wherein a second driving current upper limit of the second driving current is substantially equal to the first driving current upper limit of the first driving current; and/or a third driving current upper limit of the third driving current is substantially equal to the first driving current upper limit of the first driving current; and/or a fourth driving current upper limit of the fourth driving current is substantially equal to the first driving current upper limit of the first driving current.

4. The input device according to claim 1, wherein the driving part comprises a control unit and a driving circuit, wherein the control unit is electrically connected with the universal serial bus interface, and the driving circuit is electrically connected between the control unit and the white light-emitting diode unit, the red light-emitting diode unit, the green light-emitting diode unit and the blue light-emitting diode unit.

5. The input device according to claim 4, wherein the control unit comprises a microprocessor; or the control unit comprises a microprocessor and a first driving chip, a second driving chip, a third driving chip and a fourth driving chip corresponding to the white light-emitting diode unit, the red light-emitting diode unit, the green light-emitting diode unit and the blue light-emitting diode unit, respectively.

6. The input device according to claim 4, wherein the driving circuit comprises a first resistor, a second resistor, a third resistor and a fourth resistor corresponding to the white light-emitting diode unit, the red light-emitting diode unit, the green light-emitting diode unit and the blue light-emitting diode unit, respectively, wherein the first driving current, the second driving current, the third driving current and the fourth driving current are adjustable through the first resistor, the second resistor, the third resistor and the fourth resistor, respectively.

7. The input device according to claim 1, wherein the driving part further controls a driving power of at least one of the white light-emitting diode unit, the red light-emitting diode unit, the green light-emitting diode unit and the blue light-emitting diode unit in a pulse width modulation (PWM) manner, so that a gray level of the mixed light beam with the white balance color temperature is adjustable.

8. The input device according to claim 1, wherein the input device is a luminous keyboard or a luminous mouse.

9. The input device according to claim 1, wherein the input device is electrically connected with a computer through the universal serial bus interface, wherein when the input device is operated by a user, an input operation is performed on the computer.

10. An input device, comprising:
a universal serial bus interface;
a white light-emitting diode unit;
a red light-emitting diode unit;
a green light-emitting diode unit;
a blue light-emitting diode unit; and
a driving part electrically connected between the universal serial bus interface, the white light-emitting diode unit, the red light-emitting diode unit, the green light-emitting diode unit and the blue light-emitting diode unit, wherein the driving part receives electricity through the universal serial bus and provides a first driving current to the white light-emitting diode unit, and the driving part receives electricity through the universal serial bus and provides a second driving current to the red light-emitting diode unit and/or provides a third driving current to the green light-emitting diode unit and/or provides a fourth driving current to the blue light-emitting diode unit, wherein the white light-emitting diode unit emits a white light beam in response to the first driving current, the red light-emitting diode unit emits a red light beam in response to the second driving current, the green light-emitting diode unit emits a green light beam in response to the third driving current, and the blue light-emitting diode unit emits a blue light beam in response to the fourth driving current, wherein a first driving current upper limit of the first driving current is X1 mA, an operating current of the universal serial bus interface is X mA, and a relationship between the first driving current upper limit and the operating current of the universal serial bus interface is expressed as: $0.8X \leq X1 \leq X$.

11. The input device according to claim 10, wherein the driving part further controls a driving power of at least one of the white light-emitting diode unit, the red light-emitting diode unit, the green light-emitting diode unit and the blue light-emitting diode unit in a pulse width modulation (PWM) manner, so that a gray level of the mixed light beam with the white balance color temperature is adjustable.

12. The input device according to claim 10, wherein at least two of the white light beam, the red light beam, the green light beam and the blue light beam are mixed together, so that a mixed light with a specified color is outputted from the input device.

13. The input device according to claim 10, wherein the universal serial bus interface is a USB2.0 interface and the operating current is 500 mA; or the universal serial bus interface is a USB3.0 interface and the operating current is 900 mA; or the universal serial bus interface is a USB3.1 interface and the operating current is 5000 mA.

14. The input device according to claim 10, wherein a second driving current upper limit of the second driving current is substantially equal to the first driving current upper limit of the first driving current; and/or a third driving current upper limit of the third driving current is substantially equal to the first driving current upper limit of the first driving current; and/or a fourth driving current upper limit of the fourth driving current is substantially equal to the first driving current upper limit of the first driving current.

15. The input device according to claim 10, wherein the driving part comprises a control unit and a driving circuit, wherein the control unit is electrically connected with the universal serial bus interface, and the driving circuit is electrically connected between the control unit and the white light-emitting diode unit, the red light-emitting diode unit, the green light-emitting diode unit and the blue light-emitting diode unit.

16. The input device according to claim 15, wherein the control unit comprises a microprocessor; or the control unit comprises a microprocessor and a first driving chip, a second driving chip, a third driving chip and a fourth driving chip corresponding to the white light-emitting diode unit, the red light-emitting diode unit, the green light-emitting diode unit and the blue light-emitting diode unit, respectively.

17. The input device according to claim 15, wherein the driving circuit comprises a first resistor, a second resistor, a third resistor and a fourth resistor corresponding to the white light-emitting diode unit, the red light-emitting diode unit, the green light-emitting diode unit and the blue light-emitting diode unit, respectively, wherein the first driving current, the second driving current, the third driving current and the fourth driving current are adjustable through the first resistor, the second resistor, the third resistor and the fourth resistor, respectively.

18. The input device according to claim 10, wherein the input device is a luminous keyboard or a luminous mouse.

\* \* \* \* \*